P. COMPTON.
Bee Hive.
No. 78,062.             Patented May 19, 1868.
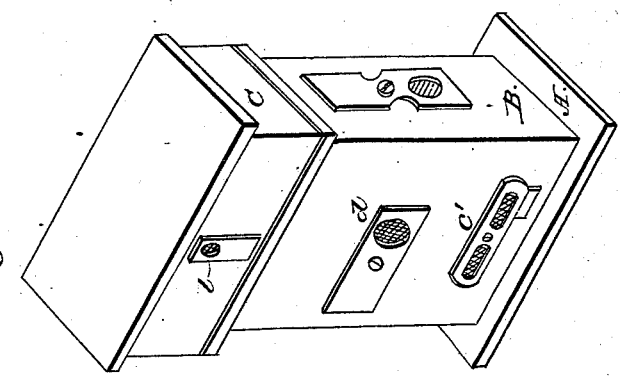
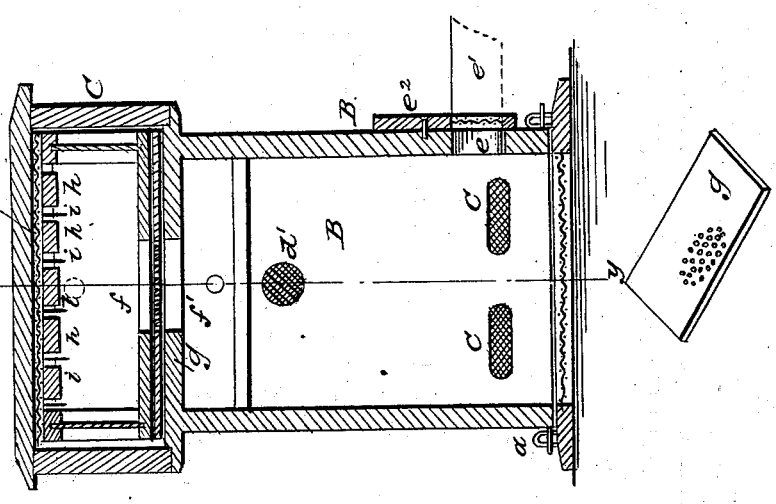
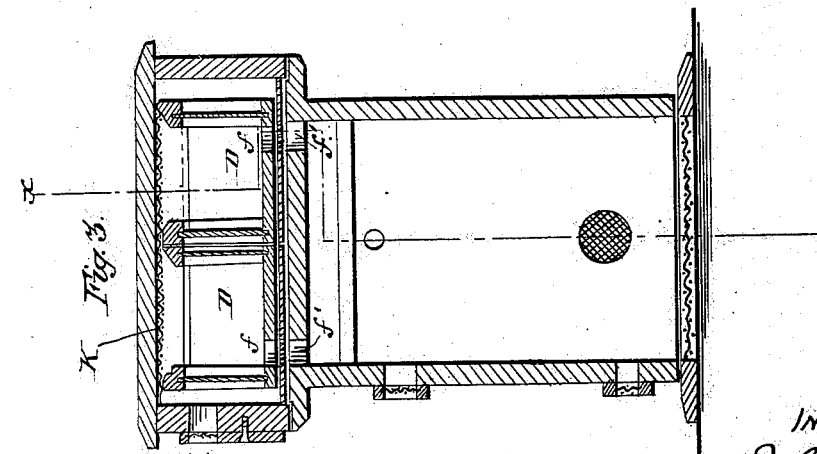

United States Patent Office.

PETER COMPTON, OF SULLIVANSVILLE, NEW YORK.

Letters Patent No. 78,062, dated May 19, 1868.

---

IMPROVEMENT IN BEE-HIVES.

---

The Schedule referred to in these Letters Patent and making part of the same.

---

TO ALL WHOM IT MAY CONCERN:

Be it known that I, PETER COMPTON, of Sullivansville, in the county of Chemung, and State of New York, have invented a new and useful Improvement in Bee-Hives; and I do hereby declare that the following is a full, clear, and exact description thereof, which will enable those skilled in the art to make and use the same, reference being had to the accompanying drawings, forming part of this specification.

The nature of my invention relates to improvements in bee-hives, having for their object a ready means of protecting the bees from the attacks of insects or other colonies of bees; also, a means of transferring them from one hive to another, more perfect ventilation, an arrangement of boxes whereby the box-honey may be readily taken out in cakes as required for use, and a means of shutting off the communication between the main hive and the upper portion, where the glass boxes are placed, as will be more fully described on reference to the drawings, in which—

Figure 1 represents a perspective view of my improved hive,

Figure 2 a section on the line $x\ x$ of fig. 8, and

Figure 3 a section on the line $y\ y$ of fig. 2.

Similar letters represent corresponding parts in all the figures.

A represents the base.

B, the main portion, which is secured to the bottom, A, by the staples and links $a$. The central portion of the part, A, corresponding in size and shape to the interior of the portion B, is composed of a webbing of fine-wire cloth, to admit a circulation of air.

$c\ c$ are openings into the portion B of the hive, for the passage in and out of the bees, which said openings may be closed against the attacks of other bees or insects by turning the button $c'$, having openings through it corresponding with the said holes $c\ c$, but which are protected by perforated covering of wire cloth or sheet metal.

$d'$ is another opening above the said openings $c$, for the admission of air or light, as may be desired, at the proper times, and which may be covered by the button $d$, having an opening covered by perforated material, or it may be entirely closed, and the light shut out, by the other end of the said button, if desired.

$e$ is another opening, communicating with the interior of the part, B, which may be used for transferring the bees from the hive to another, or from another to it, by means of the tube $e'$, having one end inserted into the said opening $e$, and the other end into a corresponding opening in the other hive.

$e^2$ is also a swinging cover for the said opening, corresponding with the said cover $d$.

C is a cap, placed upon the top of the part, B, in which are disposed the glass boxes for the reception of the box-honey.

D D are the glass boxes, provided with openings $f\ f$ in their bottoms, corresponding with holes in the top of the part, B, through which the bees may pass up and down for the purpose of depositing the honey in the said boxes.

These passages may be closed to the passage of the bees by the interposition of the plates $g\ g$ between the said boxes and the part, B, the plates having perforated portions, which may be placed over the openings, and admit the air from one part to the other, or the plain portions of the said plates may be laid over the openings, stopping the passage of either air or light.

The said boxes D D are provided with cross-pieces on their tops, arranged at suitable distances apart, the ends being dropped into notches in the upper edges of the side pieces of the boxes, in a manner to be readily taken out or replaced, and between each cross-piece $h$ is arranged a piece of tin or other thin sheet metal, which serves to cause a separation of the honey deposited on each cross-piece from the other, whereby, when the box has been filled, and replaced in the hive by another, the part adhering to each cross-piece may be taken out separately from the other, which may remain in the box unmolested until it is wanted for use.

$k$ represents a hinged covering for the boxes D, whereby the honey is protected from insects when the box has been taken out of the hive.

$l$ represents an opening into the cap, C, to provide a circulation of air in winter, and prevent the formation of ice or frost inside the hive, from the heated air from the bees accumulating in the top of the hive, and congealing therein, which, by this arrangement, will pass off through the said opening $l$ into the air, and thereby preserve the air within the hive in a drier state.

The cap, C, is connected to the part, B, by a loose connection, which admits of its ready removal or replacement.

One side of the part, B, is connected to the other parts by an adjustable connection, whereby it is readily removed, to take out the honey which may be deposited in it, or for any other purpose.

Having thus fully described my improvements, what I claim, and desire to secure by Letters Patent, is—

1. The herein-described improved bee-hive, when constructed and arranged substantially as and for the purpose described.

2. In combination with the boxes D D, provided with the detachable portions $h\,h$, and metal strips $i\,i$, the metallic perforated covers $k$, substantially as and for the purpose described.

PETER COMPTON.

Witnesses:
    DANIEL CARPENTER,
    WILLIAM WORDEN.